Figure 1:
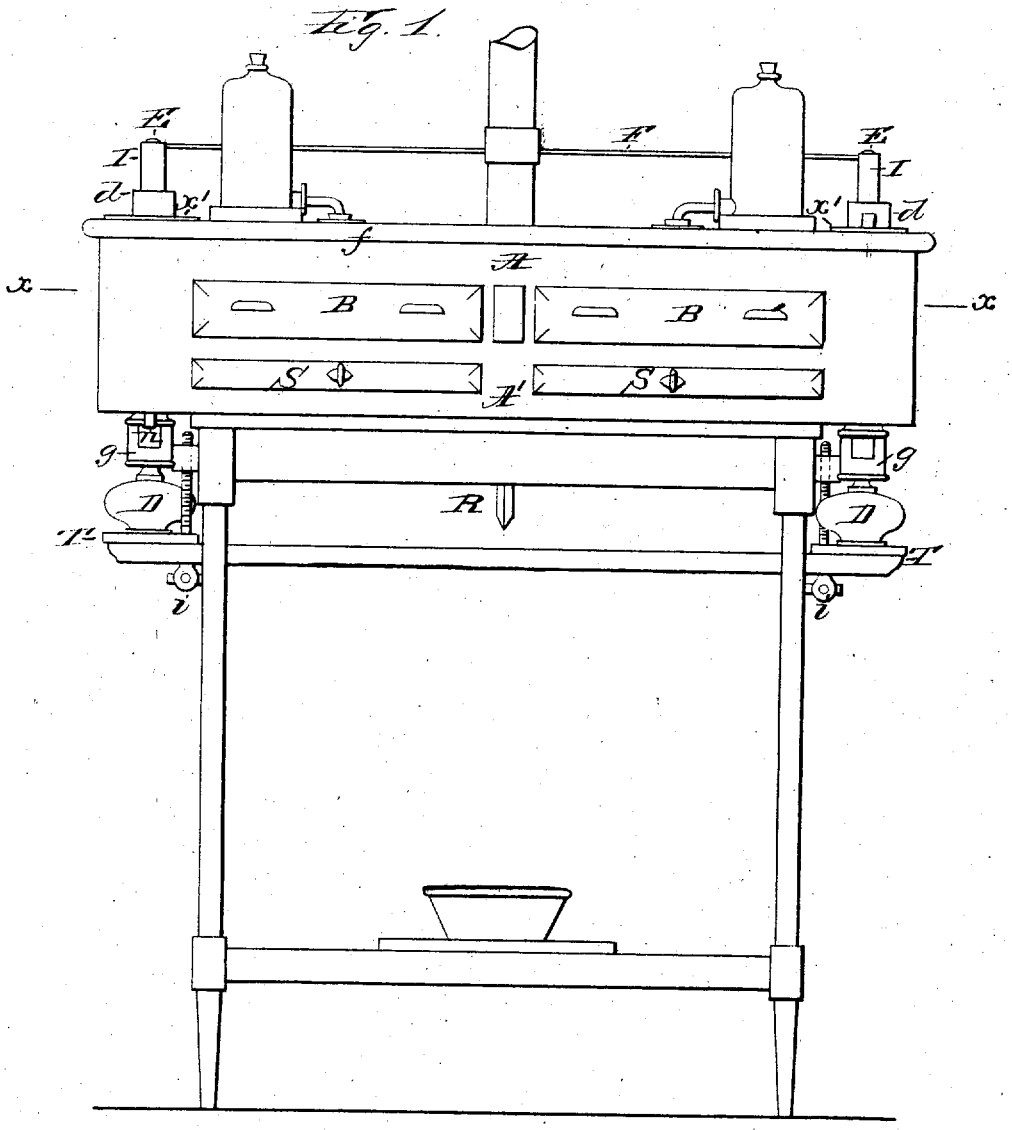

4 Sheets—Sheet 1.

E. S. RENWICK.

INCUBATOR.

No. 10,716. Reissued Apr. 27, 1886.

WITNESSES

Edward Walter

Jas. E. Warner

INVENTOR

E. S. Renwick

E. S. RENWICK.

INCUBATOR.

No. 10,716. Reissued Apr. 27, 1886.

WITNESSES

Edward Walter

Jas. E. Warner

INVENTOR

E. S. Renwick

4 Sheets—Sheet 3.
E. S. RENWICK.
INCUBATOR.
No. 10,716. Reissued Apr. 27, 1886.
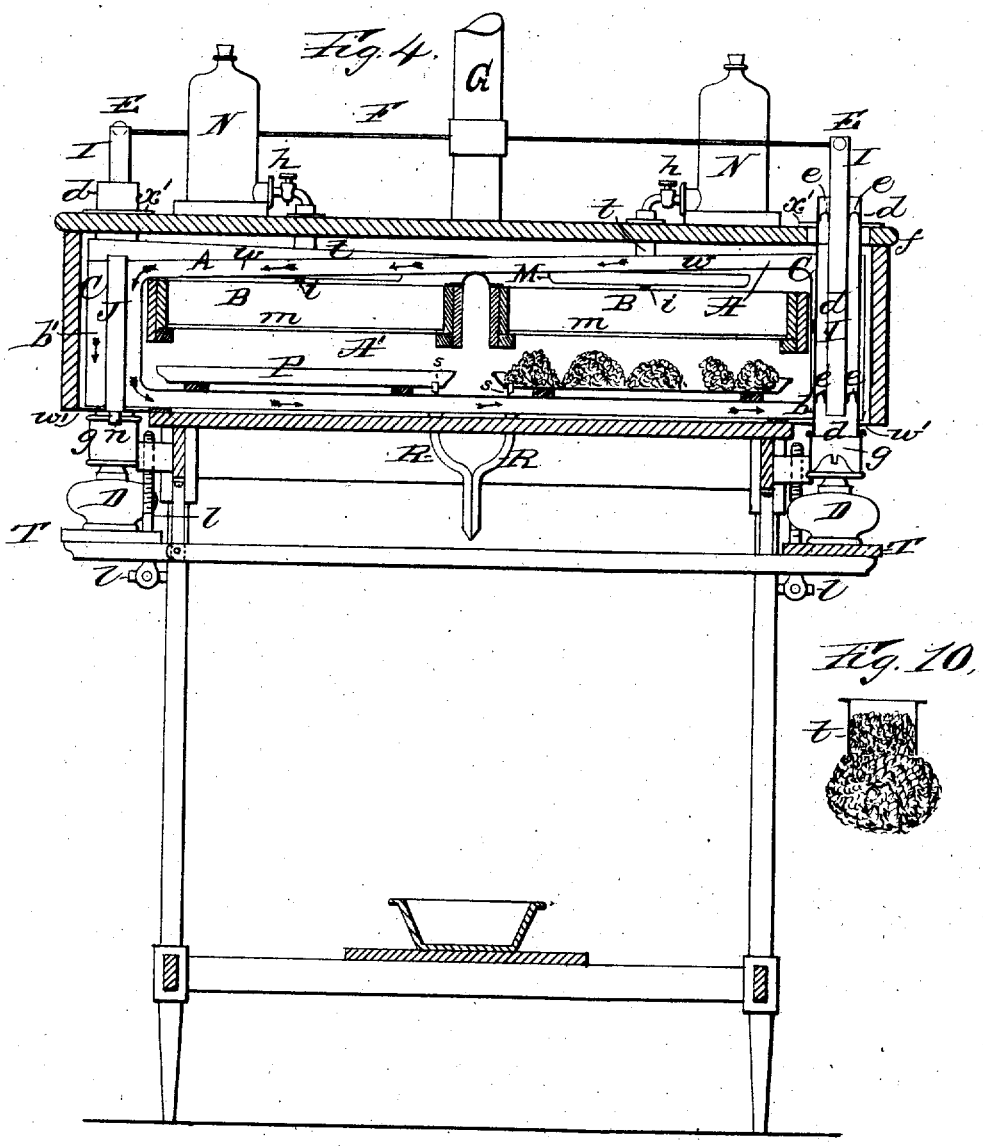
WITNESSES
Edmund Walter
Jas. E. Warner
INVENTOR
E. S. Renwick

E. S. RENWICK.
INCUBATOR.
No. 10,716. Reissued Apr, 27, 1886.
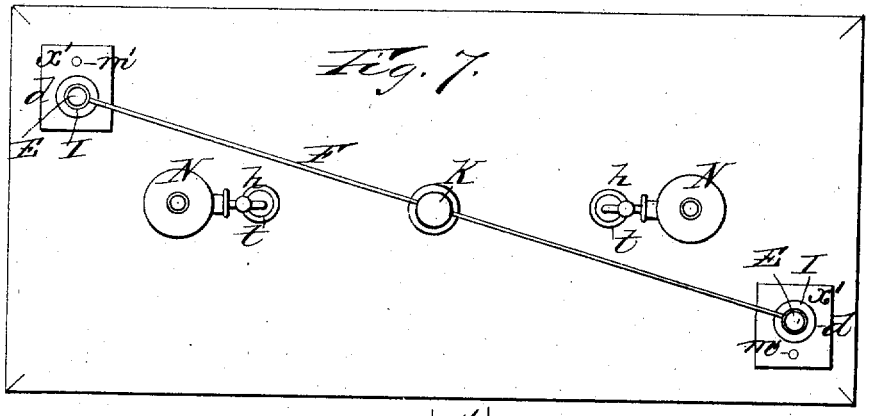
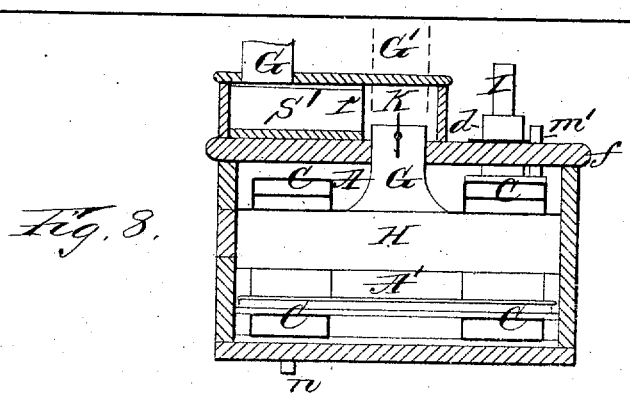
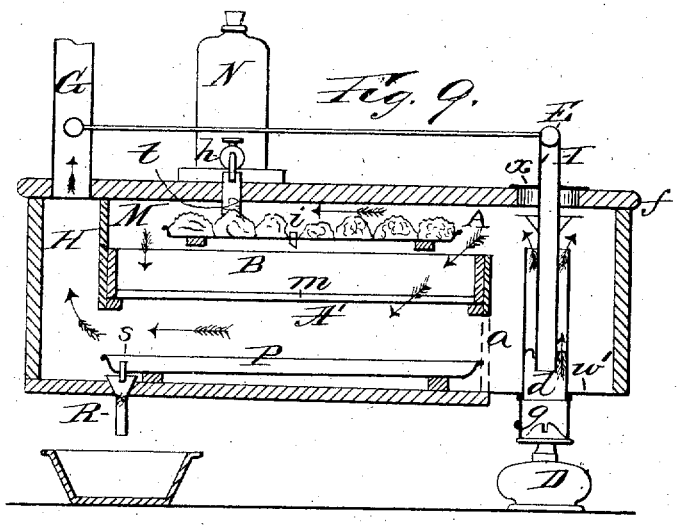
WITNESSES
Edward Walter
Jas. E. Warner
INVENTOR
E. S. Renwick

UNITED STATES PATENT OFFICE.

EDWARD SABINE RENWICK, OF MILLBURN, NEW JERSEY.

INCUBATOR.

SPECIFICATION forming part of Reissued Letters Patent No. 10,716, dated April 27, 1886

Original No. 193,616, dated July 31, 1877. Application for reissue filed July 10, 1885. Serial No. 171,231.

*To all whom it may concern:*

Be it known that I, EDWARD SABINE RENWICK, of Millburn, in the county of Essex and State of New Jersey, have made an invention of certain new and useful Improvements in Incubators; and I hereby declare that the following is a full, clear, and exact description and specification of the same.

The requisites of an incubator are a regular heat, thorough ventilation, and a supply of moisture; and the object of the present invention is to attain these requisites.

To this end the invention consists of certain combinations of instrumentalities, of which the following are the principal, viz: The incubating-chamber, within which the eggs are placed; one or more egg-holders to hold the eggs to be hatched and enable them to be manipulated readily; these egg-holders may have either the form of drawers or of stationary shelves or racks; one or more heaters, in which warm water or other fluid may be caused to circulate for the purpose of transmitting heat to the incubating-chamber; one or more flues, by means of which heat may be applied to the incubating-chamber from a lamp or other source of heat; one or more waste-heat chimneys, for conducting off the heat from the lamp or other source of heat when it is desired that the heat shall not operate upon the incubating-chamber with its full force; one or more air-supply pipes or flues, by means of which air from the atmosphere may be introduced for ventilation into the incubating-chamber at the upper part thereof; one or more ventilating-chimneys, by means of which the foul air from the lower portion of the incubating-chamber may be discharged or permitted to escape; a thermostatic chamber, or chamber in which the thermostat or thermometer which determines the temperature of the incubating-chamber may be placed; one or more chimney-valves, by means of which the passage of the current to or through the waste-heat chimney or chimneys is regulated; one or more ventilating-valves, by means of which the current of air passed through the incubating-chamber for the purpose of ventilating the same may be regulated; this valve (or valves) is applied, by preference, to the ventilating chimney or opening, but it or they may be applied to the supply-pipes, if deemed best; one or more elevated water-trays or other moisture-suppliers, by means of which moisture can be supplied at the upper part of the incubating-chamber; one or more under water-trays or their equivalents at the lower part of the incubating-chamber, by means of which water dripping from elevated water-trays or their equivalents may be collected; a drain pipe or pipes for conducting any excess of water from the incubating-chamber.

It has been found expedient to use the heaters, egg-holders, flues, waste-heat chimneys, ventilating-flues, water-trays, and drain-pipes in pairs, the members of which are arranged to the right and left hand of the longitudinal center, or thereabout, of the incubating-chamber; but the duplication of any of the devices is not an essential part of the invention, unless it be specially claimed.

The several combinations of the above instrumentalities which constitute the invention are set forth at the close of this specification. When the entire invention is used, the said instrumentalities are so combined that the heat may either be supplied to the incubating-chamber or allowed to waste, according as the temperature is to be raised or lowered; also, that the ventilation takes place in a downward direction in the incubating-chamber, the practical advantage of which is that the air in the chamber moves downward practically uniform throughout the horizontal areas of the incubating-chamber, and that cross-drafts are prevented in whole or in part; also, that the moisture is supplied at the upper portion of the incubating-chamber, where it is most likely to saturate the air, on account of the greater temperature at that portion, and that the moisture passes downward through the egg-holders, with the air descending to the ventilating-chimney, so that the moist air is brought in contact with the eggs. Parts of the invention may, however, be used without others, so as to attain only a portion of the advantages incident to its entire use.

In order that the invention may be fully understood, I have represented in the accompanying drawings, and will proceed to describe, an incubator embodying my invention in the best form at present devised by me.

Figure 3:
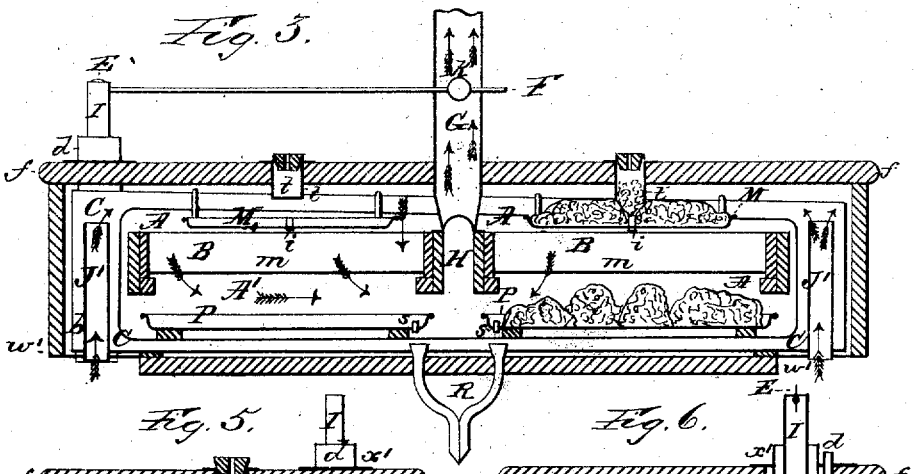
Figure 5:
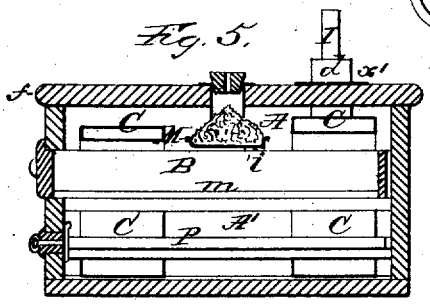
Figure 6:
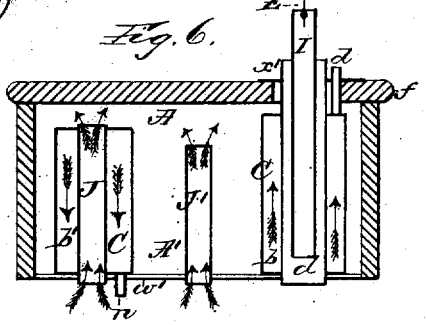
Figure 2:
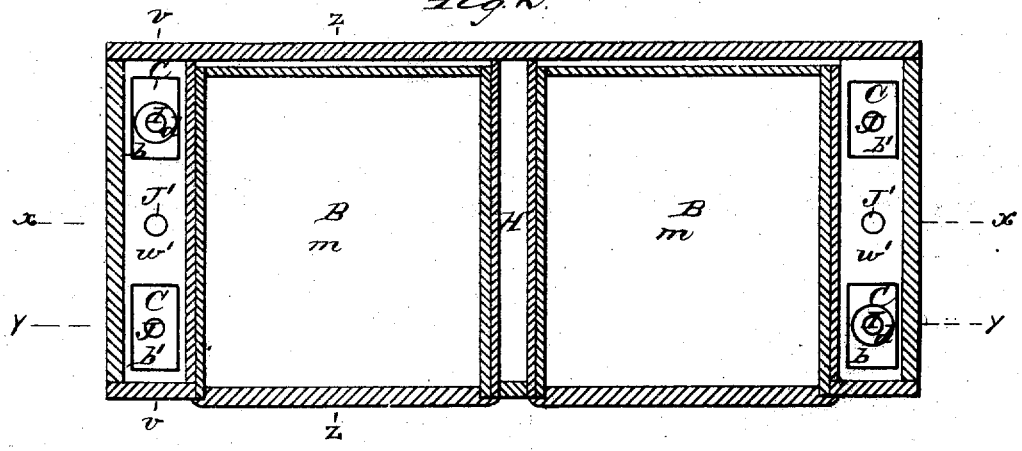

Figure 1 of said drawings represents a front view of the said incubator. Fig. 2 represents a horizontal section of the same at the line *x x* of Fig. 1. Fig. 3 represents a vertical longitudinal section of the same at the line *x x* of Fig. 2. Fig. 4 represents a vertical longitudinal section of the same at the line *y y* of Fig. 2. Fig. 5 represents a transverse section of the same at the line *z z* of Fig. 2. Fig. 6 represents a similar transverse section at the line *v v* of Fig. 2. Fig. 7 represents a top view of the said incubator. Fig. 8 represents a central vertical transverse section of the same, with a chicken-holder on top. Fig. 9 represents a central longitudinal section of a modified form of incubator embodying parts of the invention. Fig. 10 represents a central section of a modified form of moisture-supplier.

The incubating-chamber A A′ of the said incubator is fitted with two egg-drawers, B B, which in this example constitute the egg-holders, and should have bottoms *m*, composed of wire-cloth, so that the air may circulate through the drawers from the upper part, A, of the incubating-chamber (or the part thereof above the egg-holders) to the lower part, A′, of the incubating-chamber, or that part which is below the egg-holders. The bottoms of these egg-holders should be fitted with slats or other means of preventing the eggs from rolling about, or should have the form of a series of troughs in which the eggs may lie in parallel rows.

As I prefer to distribute the heat in this incubating-chamber by means of a current of warm water, a water-heater, C, is arranged within the chamber, and it is constructed, by preference, in the form of an oblong ring surrounding the top, bottom, and sides of the egg-holders. The heat is applied to one end, *b*, Fig. 4, only of this heater, and the warm water rising in that end and moving into the top *w* circulates round through the heater in the direction of the arrows in Fig. 4 to the bottom of the heated end, and rises again therein as it receives heat. As the heat is applied most conveniently to one end only of the heater, it is preferred to use two heaters for the incubating-chamber, each heater being independent of the other, and to arrange the heated ends of these heaters at the opposite ends of the chamber, so as to equalize the heat. It is also preferred to make the upper longitudinal portion, *w*, of the heater inclined; but this is not essential. If the inclination be in a direction downward from the heated upright end *b*, the warm water is brought closer to the eggs beneath as the temperature of the water decreases by radiation, which tends to equalize the temperature.

The heat is generated conveniently by means of a lamp, D—one for each heater. The heated gases from the lamp are conducted through a tubular flue, *d*, which is passed through the heater and through the top *f* of the incubating-chamber, so that the heated gases may impart heat to the water in the heater, and may then escape. The kind of lamp which has been used with success is a kerosene-lamp with a burner of the usual construction, and with a short chimney, *g*, communicating with the lower end of the flue *d*. The lamp-chimney may be made of sheet metal with a small pane of mica, so that the condition of the flame may be seen.

In order that the heat by the flue *d* may be controlled, a waste-heat chimney, I, is provided for each flue. The chimney is by preference located within the flue *d*, and centrally thereof, it being supported by spring-brackets *e*, which bear upon the wall of the flue with sufficient friction to hold the chimney in place. At the top of this chimney there is a valve, E, which is fitted to turn with a shaft, F. When this chimney-valve is closed, the hot gases from the lamp are prevented from passing through the waste-heat chimney I, and consequently pass along the walls of the flue *d* and impart heat to the incubating-chamber. When the valve E is open, the hot gases from the lamp pass through the waste-heat chimney I and escape, so that the heat wastes in whole or in part without increasing the temperature of the incubating-chamber.

In order that the incubating-chamber may be ventilated with warm air, a supply-pipe, J, is provided for each heater, such pipe being passed through the descending end *b′* thereof, and communicating at its lower end with the external air through a hole in the bottom of the incubating-chamber. The upper end of this ventilating-pipe discharges the air into the upper part, A, of the incubating-chamber, and as the pipe is surrounded by the warm water in the heater the air which is supplied to the incubating-chamber by this pipe J is warmed before escaping into the chamber, so that the pipe is a warm-air-supply pipe.

In order that the incubating-chamber may be ventilated with fresh air, which is not warmed artificially, a ventilating air-pipe, J′, is provided at each end of the incubating-chamber. Each of these cold-air pipes receives the air at its lower end and discharges the air at its upper end into the upper part, A, of the incubating-chamber.

In order that the foul air in the incubating-chamber may be discharged, a ventilating pipe or chimney, G, is provided. This chimney is connected at its lower end with the lower part, A′, of the incubating-chamber, the connection in this example being made through the intervention of a chamber, H, which is arranged between the two egg-holders B B, and forms the entrance to the ventilating-chimney, the said chamber being closed at its sides and top, but open beneath; hence the air which passes from the incubating-chamber is taken from the lower part, A′, thereof, while, as above stated, the fresh air is discharged into the incubating-chamber in the upper part, A, thereof, so that the direction of ventilation in the incubating-chamber is from above downward, instead of from the lower part of the incubating-chamber upward, as has heretofore been practiced.

The small chamber H is constructed, by preference, of the whole breadth of the incubating-chamber from front to rear, and as there is a current of air through it from the incubating-chamber outward the temperature in this small chamber varies with that of the incubating-chamber; hence this small chamber is well adapted to hold the thermostat or thermometer which is used to regulate the temperature of the incubator, and it is designated the "thermostatic chamber."

In order that the ventilation of the incubating-chamber may be controlled, the ventilating-chimney G is fitted with a valve, K, which may be opened more or less.

In practice it has been found best to make the ventilating-valve K either smaller than the ventilating-chimney or with a central hole in it, so that the ventilation is never wholly stopped.

In order that the incubating-chamber may be supplied with moisture, the water-tray M is arranged in the upper part, A, thereof over each egg-holder. Each of these trays is fitted with sponges, and each tray is supplied, through a short tube or nozzle, *t*, with water from a water-bottle, N, on top of the incubator, the supply being controlled by a stop-cock, *h*.

In practice it has been found expedient to run lamp-wick through the passage of the stop-cock and its key, so that the water may be allowed to drip drop by drop, and the greater or less speed of the supply can be regulated by turning the key of the stop-cock more or less so as to compress the lamp-wick accordingly.

Each water-tray is provided, by preference, with an overflow-pipe, *i*, whose upper end is raised above the bottom of the tray, but is lower than the upper edge thereof, so that sponges are always lying in water.

By supplying moisture at the top of the incubating-chamber, where the heat is greater than it is at the egg-holder, the air can be more highly charged with moisture, and consequently there is less risk of the eggs becoming dried by the heat.

In order that the surplus water which drips from the elevated water-trays M may be collected, a water-tray, P, is arranged in the lower part, A′, of the incubating-chamber under each egg-holder. As the bottoms of the egg-holders are formed of wire-cloth, the dripping water can pass through these bottoms to the under water-trays, P P.

It is preferred to make these under water-trays of large horizontal area, so that if an egg should be rotten and should burst, its contents may be caught in the water-tray beneath. It is also preferred to construct each under water-tray with an overflow or drip pipe, *s*, whose upper end is raised above the bottom of the tray, but is lower than the upper edge thereof, so that a layer of water is maintained in the tray. These under trays may be furnished with sponges, to supply moisture by evaporation to the lower part of the incubating-chamber.

The bottom of the incubating-chamber is fitted with one or more drain-pipes, R, so that any surplus water that may escape from the overflow-pipes of the under water-ways may be conducted out of the incubating-chamber. An opening closed by a door, S, also is provided in the front of the incubating-chamber, and opposite each under water-tray, P, so as to permit it to be readily entered into and withdrawn from the incubating-chamber.

A piece of sponge may be inserted in each drain-pipe R, or in the conical mouth thereof, to prevent the access of air, while permitting the escape of water; or the lower end of the drain-pipe may either dip into a pan of water or have a trap upon it for the same purpose.

The incubator thus described is well adapted to be automatically regulated by means of a thermostat placed in the thermostatic chamber H and connected with the escapement of a va e mechanism operated by a weight or by a spring, the connection being such that when the heat rises to a certain predetermined limit the valve mechanism shall be permitted to move sufficiently to open the chimney-valves and permit the heat of the lamps to waste in whole or in part; and, on the other hand, when the heat falls to a certain predetermined limit the valve mechanism shall be permitted to move sufficiently to close the chimney-valves, and thus compel the heat from the lamps to act upon the incubating-chamber.

In order that both the chimney-valves (when two are used) and the ventilating-valve may be operated simultaneously, the three are connected with one shaft, F, which in this case is extended diagonally across the top of the incubating-chamber, so that the turning of this shaft a quarter of a revolution opens or shuts all three valves.

The incubating-chamber may be constructed mainly of wood, but it is expedient that those parts *w′* of its bottom which are near the lamps should be made of sheet metal, so as to obviate danger from fire. It is also expedient to guard the openings made in the top of the incubator for the passage of the flues *d*-with plates *x′* of sheet metal fitting closely to the flues.

The water-heaters, flues, air-supply pipes, and ventilating-pipe are most conveniently made of sheet metal—such, for example, as galvanized iron.

When the above-described incubator is in operation, there is a constant current of fresh air downward in the incubating-chamber through the egg-holder, and upward through the ventilating-chimney. As the escape of foul air is strongest when the ventilating-valve K is open, the fresh air at that time is supplied both by the cold-air pipes J′ and by the hot-air pipes J. When, however, the ventilating-valve is shut, a less quantity of fresh air is required to supply the incubating-chamber, and as the fresh air tends to rise in the hot-air pipes J (by reason of the draft through them) more rapidly than it does in the cold-air pipes J′, the supply of fresh air then takes place mainly through the former. If, however, the whole invention is not to be used, either kind of air-supply pipes may be omitted, as well as other parts of the invention. If, for example, it be deemed best to apply the heat to the incubating-chamber without water-heaters, the flues *d* may be conducted directly through the chamber, and, if deemed advisable, may be made zigzag, so as to afford a large radiating-surface; or the hot air from the lamps or from steam-pipes may be conducted directly into the incubating-chamber. In such cases the waste-heat pipes may be suitably arranged to permit the heat to waste according to the mode of heating used, because, although the arrangement of the waste-heat chimney centrally within the flue is the most convenient one when a lamp is used as the source of heat, yet this arrangement is not essential.

One mode of direct heating which may be adopted is represented at Fig. 9, in which the several parts of the incubator are designated by the same letters as the corresponding parts in the preceding figures. In this case the flue *d* discharges the hot air near the top of the incubating-chamber, so that it operates both as the warm-air pipe for supplying air for ventilation and as the flue for the heat, and it is the equivalent of each of those represented in the previous figures. This flue may be forked, or Y-formed, so as to distribute the heat toward the front and rear of the incubating-chamber; or the flue may consist of a lateral chamber, made by extending the adjacent drawer-slide downward, as indicated by the dotted lines at *a*, so as to form a partition. When the heating is effected directly in the manner thus indicated, the fumes of the lamp will pass into the incubating-chamber. This may be avoided either by extending the flue *d*, Fig. 9, directly upward through the top of that chamber, or by connecting the upper end of the flue with a pipe extending nearly horizontally through the upper portion of the incubating-chamber, and having its end turned upward through the top thereof, so that a larger radiating-surface will be attained. In either of these last two cases, if ventilation is to be properly preserved, a separate air-pipe should be provided to supply the air for that purpose.

Two egg-holders arranged at opposite sides of a central ventilating-chimney and thermostatic chamber may of course be used in connection with any one of the above plans.

In practice it has been found convenient to construct a chicken-holder (for newly-hatched chickens) upon the top of the incubator and to make a break in the ventilating-chimney, so that the chicken-holder may be heated by the heat of the air passing from the incubator. Such an arrangement is represented at Fig. 8, where the chicken-holder S′ is a drawer with a wire-cloth back, *r*, to permit the warm air to pass through it. If this chicken-holder be omitted, the chimney G may extend, as represented in dotted lines at G′.

The forms of the water-heaters may be greatly varied. Thus there may be but one heater, and it may be flat and in the upper part of the incubating-chamber; or the part of the heater to which the heat of the lamp is applied may be outside of the incubating-chamber, and this exterior part may be connected with the interior heater by circulating-pipes.

In practice it has been found convenient to support each lamp upon a movable platform, T, raised or lowered by a screw, *l*, and to make the lamp-chimney *g* slip either over or within the lower end of the flue *d*, so as to make a tolerably close joint therewith. The lamp-support can then be readily raised or lowered, so that its chimney may be connected with or disconnected from the flue *d*.

An incidental advantage of a close connection between the lamp-chimney and the flue is that, inasmuch as the draft is stronger when the waste-heat chimney I is operating—that is, when the chimney-valve is open—the practical effect of the increased strength of the draft is to cut down the flame of the lamp, so that the opening of the waste-heat valve E not only permits heat to waste, but incidentally reduces the volume of the flame of the lamp.

The chimney-valve need not necessarily be arranged, as shown in the drawings, at the outlet of the waste-heat chimney, as it may be arranged at its lower end, or in such manner that it changes the direction of the current of hot air from operating upon the incubating-chamber to passing through the waste-heat chimney, and vice versa. The valve also may be of another form than that of a disk turning on a diametrical axis.

In place of making the elevated moisture-suppliers in the form of trays, a suspended sponge or other evaporator may be used as an equivalent. A convenient mode of applying a sponge for this purpose is represented at Fig. 10, where the sponge is at the mouth of the short pipe *t*, through which the water is allowed to drip to supply the sponge.

If the elevated water-tray is used without the under water-tray, the portion of the drain-pipe R within the incubating-chamber may be arranged to receive the surplus water directly from the elevated water-tray. For this purpose the drain-pipe may either be constructed with a funnel-mouth arranged beneath the overflow-pipe of the elevated water-tray, or the drain-pipe may be extended upward in the incubating-chamber, and bent, if necessary, so as to connect with the lower end of the said overflow-pipe.

Each water-heater C should be fitted with a nozzle, *m′*, to permit water to be poured into it, and with a drain-nozzle, *n*, provided with a stop-cock, to permit the water to be drained off.

Each egg-drawer, also, should be provided with a thermometer, whose tube may be extended through the front of the drawer, and there fitted with a scale running from about 90° to 120°, so as to indicate the heat within the drawer.

If the thermostatic chamber is not used, the lower end of the ventilating-chimney should be extended downward to the level of the under side of the egg-holders, or somewhat lower.

The ventilating-chimney above described, and represented in the drawings, is stationary in the machine, or is, in other words, a stationary ventilating-chimney, as distinguished from a movable chimney combined with the movable door through which the egg tray or pan is inserted, which combination requires the chimney to be moved every time the egg-tray is opened, and is not therefore adapted to practical use. Moreover, as the stationary ventilating-chimney receives warmth from the incubating-chamber, the employment in the chimney of a lamp to create a draft is unnecessary.

I claim as my invention—

1. The combination, substantially as before set forth, of the incubating-chamber, the egg-holders, the heat-flue, and the waste-heat chimney.

2. The combination, substantially as before set forth, of the incubating-chamber, the egg-holder, the heat-flue, the waste-heat chimney, and the chimney-valve.

3. The combination, substantially as before set forth, of the incubating-chamber, the heater in the incubating-chamber, the egg-holder, the air-pipe arranged to supply air into the upper part of the incubating-chamber, and the water-tray by which moisture is supplied to the air before said air comes in contact with the eggs.

4. The combination, substantially as before set forth, of the incubating-chamber, the egg-holder, the water-tray for supplying moisture to the incubating-chamber, and the stationery ventilating-chimney arranged to discharge the air from the lower part of the incubating-chamber.

5. The combination, substantially as before set forth, of the incubating-chamber, the egg-holder, the water-tray for supplying moisture to the incubating-chamber, the stationary ventilating-chimney arranged to discharge air from the lower part of the incubating-chamber, and the ventilating-valve which regulates such discharge.

6. The combination, substantially as before set forth, of the incubating-chamber, the egg-holder, the water-tray for supplying moisture to the incubating-chamber, the air-pipe for supplying air to the upper part of said incubating-chamber, and the stationary ventilating-chimney arranged to discharge air from the lower part of said chamber.

7. The combination, substantially as before set forth, of the incubating-chamber, the egg-holder, the water-tray arranged in the upper part of the incubating-chamber, and the under water-tray.

8. The combination, substantially as before set forth, of the incubating-chamber, the egg-holder, the ventilating-chimney, and the thermostatic chamber, whereby the air escaping from the incubating-chamber is caused to pass through the thermostatic chamber.

9. The combination, substantially as before set forth, of the incubating-chamber, two egg-holders, the thermostatic chamber arranged between the said two egg-holders, and the ventilating-chimney communicating with said thermostatic chamber.

10. The combination, substantially as before set forth, of the incubating-chamber, the egg-holder, the water-tray, and the drain-pipe whereby surplus water is conducted from the incubating-chamber.

In witness whereof I have hereto set my hand this 11th day of June, A. D. 1885.

EDWARD SABINE RENWICK.

Witnesses:
G. M. BARRETTO,
JAS. E. WARNER.